United States Patent [19]
Iwamoto et al.

[11] Patent Number: 5,245,488
[45] Date of Patent: Sep. 14, 1993

[54] LOW-NOISE COMPOSITE MAGNETIC HEAD FOR RECORDING AND PRODUCING

[75] Inventors: Osamu Iwamoto; Atsuo Kobayashi; Takahiro Sato, all of Nagano, Japan

[73] Assignee: Seiko Epson Corporation, Nagano, Japan

[21] Appl. No.: 866,090

[22] Filed: Apr. 6, 1992

Related U.S. Application Data

[63] Continuation of Ser. No. 587,583, Sep. 24, 1990, abandoned, which is a continuation of Ser. No. 85,059, Aug. 13, 1987, abandoned.

[30] Foreign Application Priority Data

| Aug. 13, 1986 | [JP] | Japan | 61-189912 |
| Oct. 15, 1986 | [JP] | Japan | 61-244635 |
| Nov. 26, 1986 | [JP] | Japan | 61-281595 |
| Dec. 15, 1986 | [JP] | Japan | 61-297903 |
| Mar. 25, 1987 | [JP] | Japan | 62-71007 |

[51] Int. Cl.⁵ .................................................. G11B 5/23
[52] U.S. Cl. .................................... 360/119; 360/103; 360/122; 360/125
[58] Field of Search ............... 360/103, 125, 126, 119, 360/120, 122, 121

[56] References Cited

U.S. PATENT DOCUMENTS

| 2,911,481 | 11/1959 | Augustin | 360/120 |
| 3,435,155 | 3/1969 | Van Der Voo | 360/119 |
| 4,152,741 | 5/1979 | Mizuno et al. | 360/119 |
| 4,217,613 | 8/1980 | Schwartz | 360/119 |
| 4,544,974 | 10/1985 | West, Jr. et al. | 360/122 |
| 4,658,314 | 4/1987 | Sasazaki | 360/103 |
| 4,670,807 | 6/1987 | Gorter et al. | 360/120 |
| 4,701,819 | 10/1987 | Inagoya et al. | 360/122 |
| 4,709,284 | 11/1987 | Endo et al. | 360/103 |
| 4,742,412 | 5/1988 | Kuriyama | 360/120 X |
| 4,768,118 | 8/1988 | Kuriyama | 360/120 X |
| 4,794,483 | 12/1988 | Naitoh et al. | 360/120 |
| 4,796,133 | 1/1989 | Kuriyama | 360/126 X |

FOREIGN PATENT DOCUMENTS

| 49-39296 | 10/1974 | Japan . | |
| 0035315 | 2/1985 | Japan | 360/113 |
| 0020212 | 1/1986 | Japan | 360/120 |
| 0192010 | 8/1986 | Japan | 360/120 |
| 0781917 | 12/1980 | U.S.S.R. | 360/120 |

Primary Examiner—Andrew L. Sniezek
Attorney, Agent, or Firm—Blum Kaplan

[57] ABSTRACT

An improved composite magnetic recording head having a core chip with two opposed magnetic members via a magnetic gap and a nonmagnetic layer is disposed on at least one of the magnetic members and a thin magnetic layer is disposed on the non-magnetic layer. The thin magnetic layer has a higher saturation flux density than the magnetic members and the non-magnetic layer increases the adhesive strength between the thin magnetic layer and the magnetic member. The core chip fits into a slide member and is integrated using an adhesive glass.

28 Claims, 9 Drawing Sheets

FIG. 17

LOW-NOISE COMPOSITE MAGNETIC HEAD FOR RECORDING AND PRODUCING

This is a continuation of application Ser. No. 07/587,583, filed Sep. 24, 1990, which is a continuation of application Ser. No. 07/085,059, both now abandoned.

BACKGROUND OF THE INVENTION

This invention relates to magnetic recording heads for recording and reproducing high frequency signals and, in particular, to magnetic recording heads that do not generate ficticious output noise.

Figure 1:
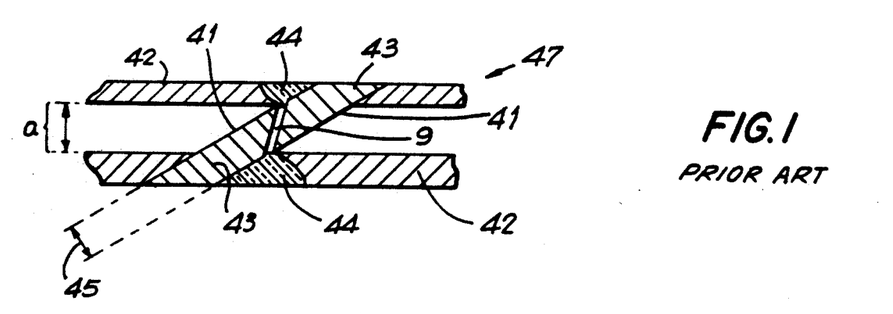
FIG. 1 is an front elevational view of a prior art magnetic recording head.

A prior art magnetic recording head 47 is shown in FIG. 1 and is formed of two opposed thin magnetic members 42 and 42' having thin magnetic layers 43 and 43' angularly disposed thereon. Magnetic members 42 and 43 are coupled using an adhesive glass 44 with a magnetic gap 9 formed therebetween. Recording signals are introduced parallel to magnetic gap 9 and are subject to an azimuth loss as a consequence of the angle 0 between thin magnetic layers 43 and 43' and magnetic members 42 and 42' which creates a magnetic discontinuous space 41 as described in Japanese Patent Laid-Open Application No. 425906/85. A fictitious output or noise is generated by the azimuth loss from magnetic discontinuous space 41.

Figure 2:
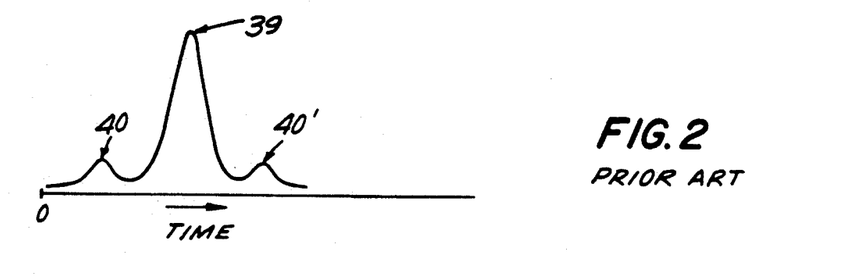
FIG. 2 is a sample output signal waveform as a function of time generated by the prior art magnetic recording head of the type shown in FIG. 1.

An output signal waveform as a function of time for a single input signal reproduced by a magnetic recording head of the type shown in FIG. 1 is shown in FIG. 2. An output signal corresponding to the original input signal is indicated as a peak 39 with fictitious outputs or noise being generated both before and after the original output as indicated by peaks 40 and 40'. The fictitious outputs or noise indicated by peaks 40 and 40' cannot be entirely eliminated using prior art recording head constructions.

In particular, when recording head 47 of FIG. 1 is used in a magnetic disk drive, the inner and outer cylinders have different radii and therefore different curvatures. Fictitious outputs or noise signals are generated as a function of the radii of the inner and outer cylinders and are one disadvantage of the structure.

Furthermore, the thickness of the thin magnetic layers in prior art magnetic recording heads affects the width of the recording signals and is generally about 20um. It takes about 20 hours to form a 20um thick magnetic layer by sputtering, which is a disadvantage of the manufacturing process. Additionally, the thicker the thin magnetic layers, the greater the stress and the greater the possibility that the layers will peel off and decrease the manufacturing yield.

These structure also are not durable due to the relative thickness of the thin magnetic layers. When the layers are brought into direct contact with a recording medium, material is removed from the thin magnetic layers and the recording medium or other portions of the magnetic head are injured as a result. Removal of material from the thin magnetic layers changes the width of the magnetic gap. However, it is important to accurately control the width of the magnetic gap since the magnetic gap has a width precisely equal to the width of the recording signal. Removal of material from the thin magnetic layer therefore results in an increased fictitious output or noise. Finally, the structure has assembly difficulties and a low manufacturing yield due to the necessity of using two thin magnetic layers to form the magnetic gap.

Accordingly, it is desirable to provide an improved magnetic recording head which eliminates these problems associated with prior art devices and eliminates fictitious output noise.

SUMMARY OF THE INVENTION

Generally speaking, in accordance with the invention, an improved composite magnetic recording head having a core chip with a magnetic gap formed by a non-magnetic layer disposed on one of the magnetic members and a thin magnetic layer disposed on the nonmagnetic layer is provided. The outer thin magnetic layer has a higher saturation flux density than the magnetic members.

The core chip is embedded in a slide member having a slide surface which is adapted to fly across or contact a recording medium. The slide member is inclined at an angle of 25° or less with respect to the advancing edge of the recording medium. A glass having a viscosity of 104 poise at a working point of 550° C. or less is used as an adhesive for joining and integrating the slide member and the core chip. The plane of the adhesive is recessed from the slide surface by at least 30nm. The structure provided in accordance with the invention is useful for eliminating noise both before and after the output signal is generated.

Accordingly, it is an object of the invention to provide an improved magnetic recording head wherein fictitious output noise is eliminated by a magnetic discontinuous space formed between the magnetic members and the thin magnetic layer.

It is a further object of the invention to provide a magnetic recording head having improved durability.

It is still another object of the invention to provide a magnetic recording head that is easy to manufacture.

Still other objects and advantages of the invention will in part be obvious and will in part be apparent from the specification.

The invention accordingly comprises the article possessing the features, properties and the relation of elements and the several steps and the relation of one or more of such steps with respect to each of the others, which are exemplified in the following detailed disclosure, and the scope of the invention will be indicated in the claims.

DESCRIPTION OF THE DRAWINGS

For a fuller understanding of the invention, reference is had to the following description taken in connection with the accompanying drawings, in which.

DESCRIPTION OF THE PREFERRED EMBODIMENTS

The recording head of the invention has a core chip with a magnetic circuit including a thin non-magnetic layer provided between a thin magnetic layer and a magnetic member. Vertical and horizontal grooves are provided in the thin magnetic layer and the thin non-magnetic layer. Adhesion of the thin magnetic layer to the integrated magnetic member is increased by the presence of the thin non-magnetic layer and fictitious output noise is eliminated due to the relatively small difference in the expansion coefficients of the layers. A glass having a viscosity of $10^4$ poise at a working point of 550° C. or less is used as an adhesive for embedding the core chip into an integrated slide member. The construction provides a composite type magnetic head without deteriorating the magnetic properties of the thin magnetic layer.

The slide member and a slide surface of the core chip are positioned so as to have planes inclined at an angle of 25° or less with respect to the advancing edge of a recording medium. The surface of the adhesive glass is recessed from the slide surface by greater than about 30nm. This results in reduction of wear between the recording medium and the thin magnetic layer and increases reliability.

Figures 3, 4:
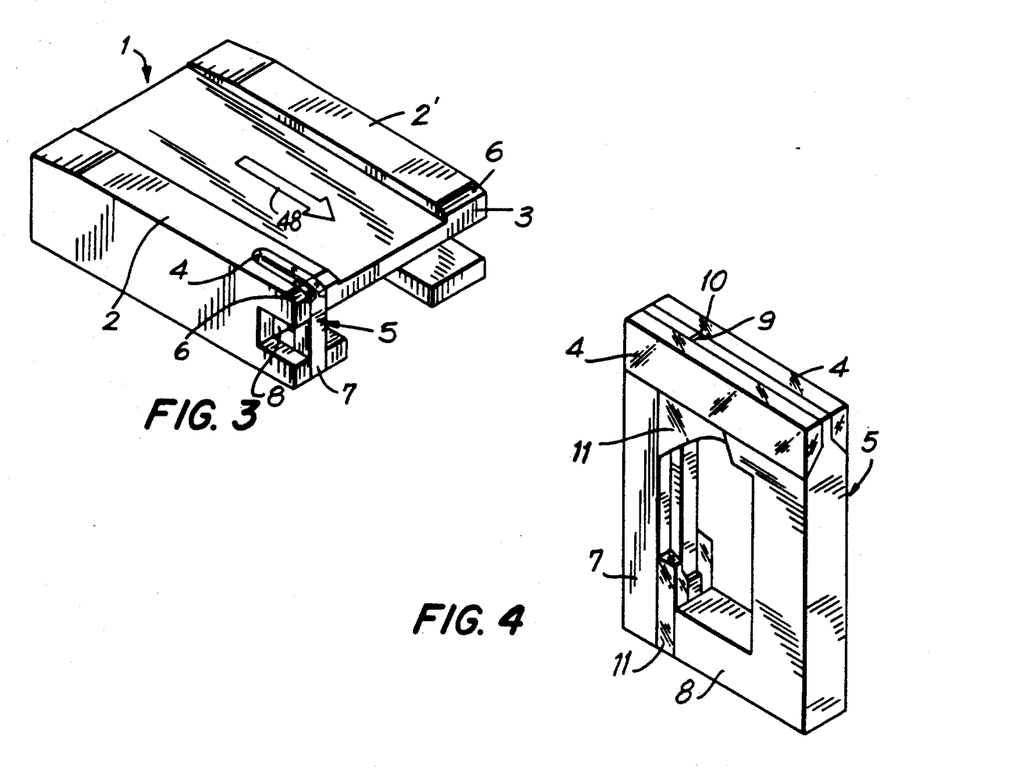
FIG. 3 is a perspective view of a composite magnetic recording head constructed and arranged in accordance with the invention.
FIG. 4 is a perspective view of a magnetic core chip for use in the composite magnetic recording head of FIG. 3.

FIG. 3 is a perspective view of a composite magnetic head 1 constructed and arranged in accordance with the invention. Composite magnetic head 1 includes a slide member 3 having two opposed slide surfaces 2 and 2' and an inclined surface 6 along one end of each of slide surfaces 2 and 2'. A magnetic core chip 5 is embedded in slide surface 2 of slide member 3. A recording medium runs on composite magnetic head 1 in the direction shown by an arrow 48.

FIG. 4 is a perspective view of magnetic core chip 5 used in composite magnetic head 1 of FIG. 1. Magnetic core chip 5 includes a magnetic U-shaped core member 8 and a magnetic I-shaped core member 7 which are joined together using a primary adhesive member 11 to form a magnetic circuit with a magnetic gap 9.

Figure 5:
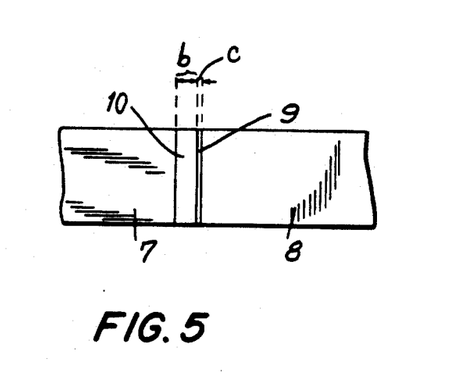
FIG. 5 is a front elevational view of the magnetic gap portion of a magnetic core chip.
Figure 6:
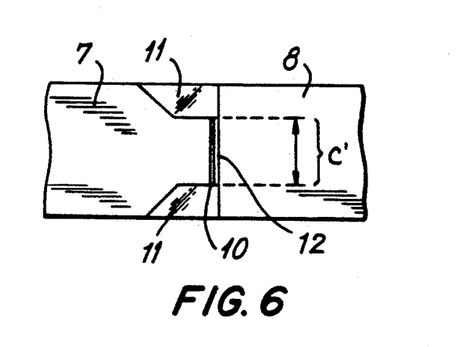
FIG. 6 is a rear elevational view of the magnetic gap portion of a core chip.

FIG. 5 is an enlarged front view of magnetic gap 9 of magnetic core chip 5 which is formed at the junction of I-shaped core 7 and U-shaped core 8. A thin magnetic layer 10 is disposed on core 7 and is parallel to magnetic gap 9 and extends the full width of magnetic gap 9 on the top side of core chip 5. In FIG. 6 which is a rear view of core chip 5, magnetic gap 9 is shown at 12.

I-shaped core 7 is disposed in the direction of advancement of a recording medium with thin magnetic layer 10 formed on core 7. Thin magnetic layer 10 has a thickness b between about 2.5 and 7μm. Thickness b is preferably equal to or greater than about 3μm in order to improve the magnetic properties of thin magnetic layer 10 including magnetic permeability and coercive force. The thicker thin magnetic layer 10 becomes, the greater the reduction in magnetic permeability and increase in coercive force.

Figure 7:
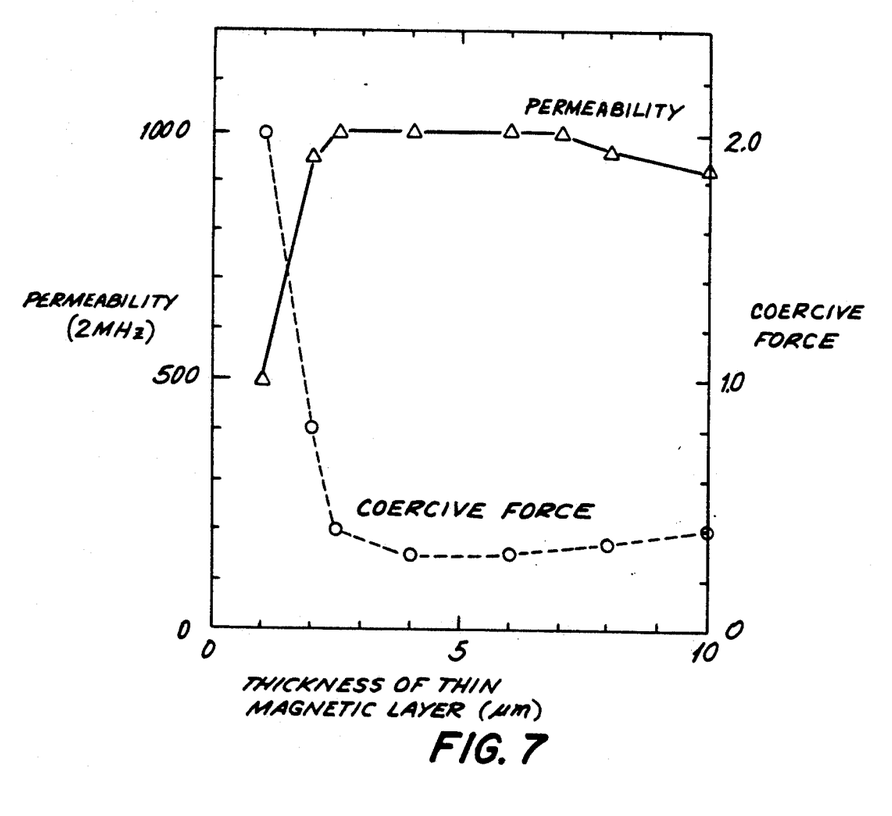
FIG. 7 is a graph showing the relationship between magnetic properties and thickness of a thin magnetic layer.

FIG. 7 is a graph showing the relationship between the thickness of a thin magnetic layer formed by sputtering and its magnetic properties. When the thickness of the thin magnetic layer is in the range between about 2.5 and 7μm, the magnetic permeability is maximized and the coercive force is minimized. If the thickness is greater than about 7μm, improved sputtering processes are necessary to improve the magnetic properties. If the thickness is less than about 2.5μm, the magnetic properties are not fully satisfactory. Thus, thin magnetic layers having thicknesses between about 2.5 and 7μm, are considered to be optimum.

Figure 8A:
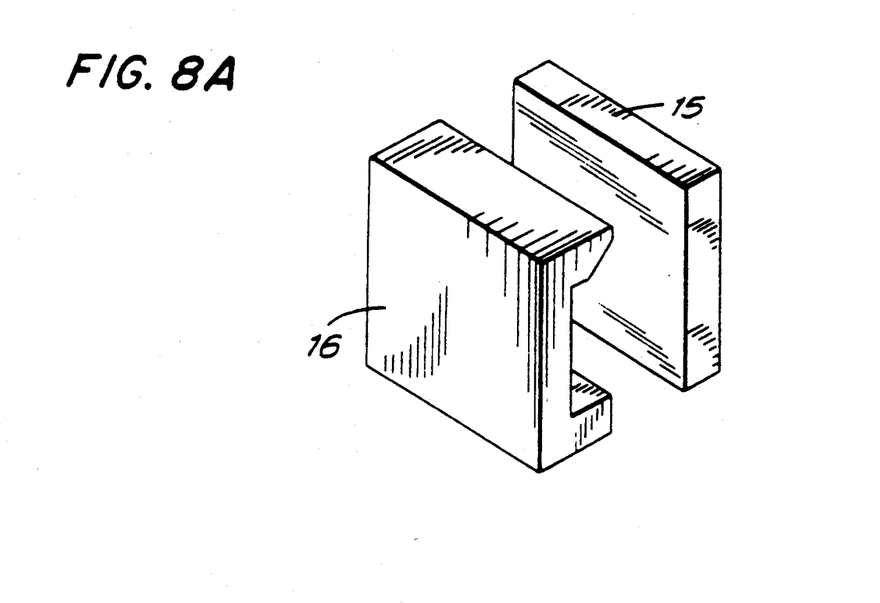
FIGS. 8A, 8B, 8C, 8D, 8E, 8F and 8G are perspective views illustrating the steps in formation of a magnetic core chip for use in accordance with the invention.
Figure 8B:
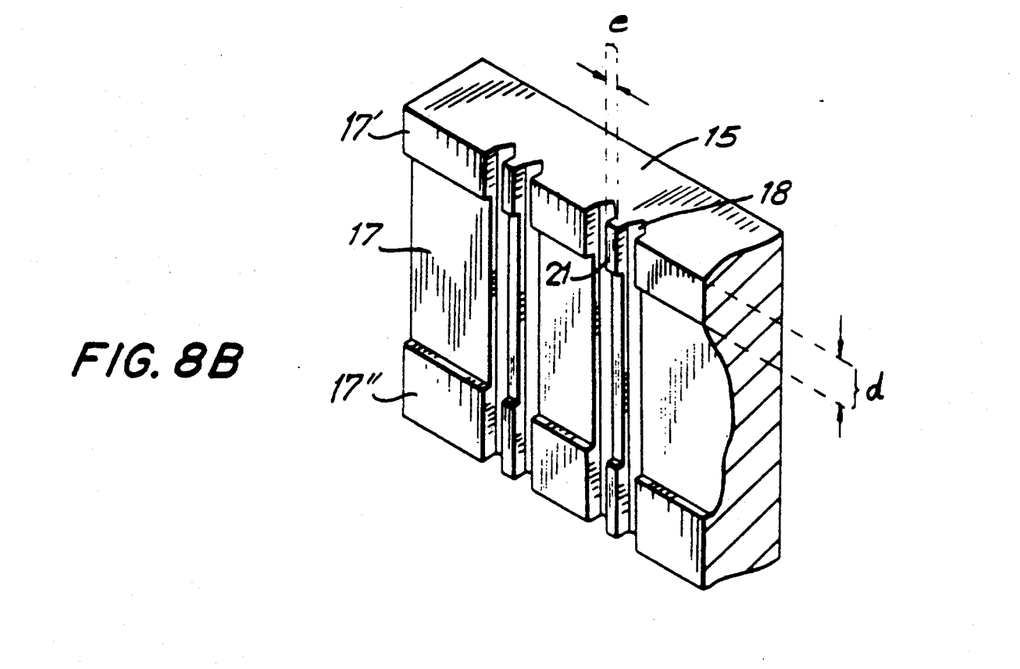

FIGS. 8A to 8G are perspective views showing various steps in the production of magnetic core chip 5 in accordance with the invention. As shown in FIG. 8A, a magnetic U-shaped block 15 and a magnetic I-shaped block 16 are provided. These are cut later in the processing to provide U-shaped magnetic core 8 and I-shaped magnetic core 7. As shown in FIG. 8B, a horizontal groove 17 is formed along the length of I-shaped block 15 which results in two projecting parallel edge surfaces 17' and 17" having a length d. A plurality of vertical grooves 18 are formed to provide a confronting surface 21 of magnetic core chip 5 having a width e.

Figure 8C:
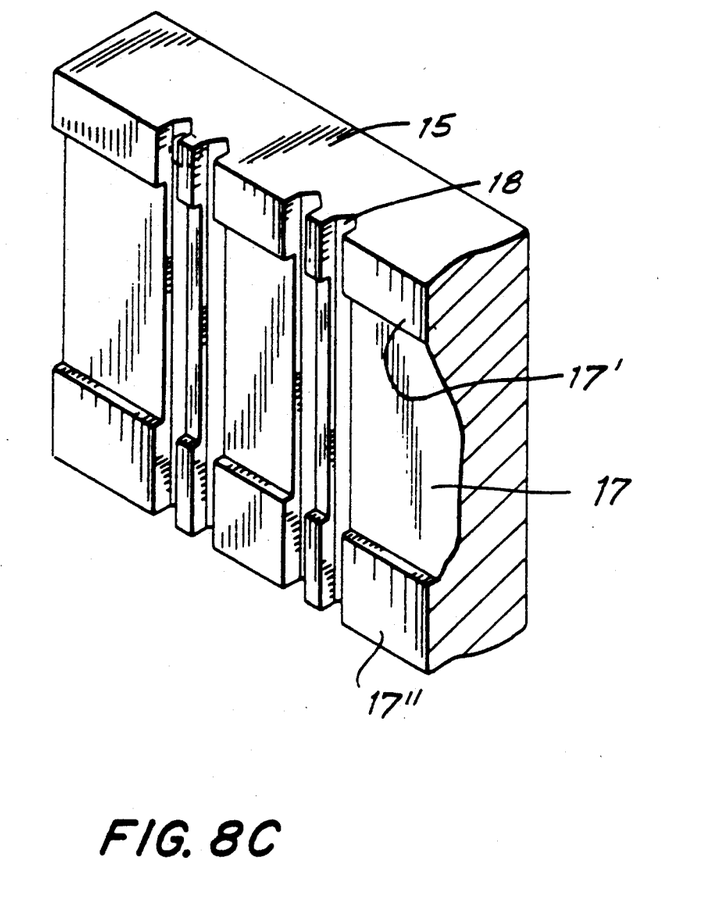

After formation of horizontal groove 17 and vertical grooves 18, a thin non-magnetic layer 22 is deposited on edge surfaces 17' and 17" of I-shaped block 15, but not in grooves 18. Thin magnetic layer 10 is deposited on non-magnetic layer 22. A silicon dioxide film 23 is deposited on thin magnetic layer 10. The width of magnetic gap 9 of core chip 5 corresponds to the thickness of SiO₂ film 23.

Figure 8D:
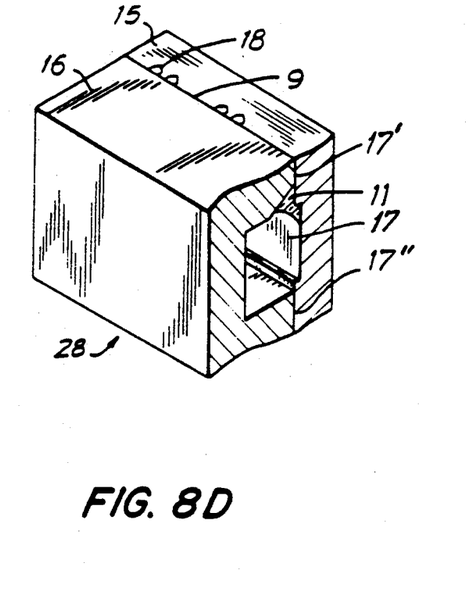
Figure 8E:
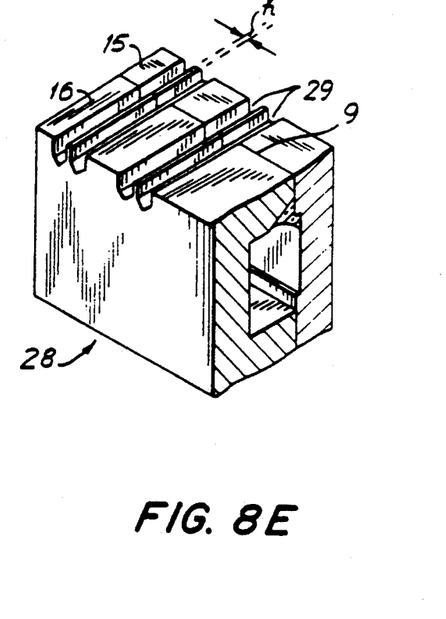

U-shaped core block 16 and I-shaped core block 15 are joined together on the grooved side of I-shaped core block 15 using a primary adhesive 11 to form a magnetic block 28 having magnetic gap 9. Primary adhesive 11 is formed by maintaining an adhesive glass at a working temperature of about 580° C. for approximately one hour. As a result of the elevated temperature, U-shaped core block 16 and I-shaped core block 15 expand. The expansion can be calculated using the coefficient of thermal expansion of each material. When the difference in the amount of expansion between U-shaped core block 16 and I-shaped core block 15 is too great, thin magnetic layer 10 lifts off of thin non-magnetic layer 22 or core block 28 cracks. The extent of expansion or expansivity is expressed by the equation:

$$A = \alpha \times T \times l$$

wherein A is the expansivity or coefficient of cubical expansion, α is the coefficient of thermal expansion of the particular material, T is the temperature to which the material is heated and l is the length of the object.

In a preferred embodiment, thin magnetic layer 10 is an alloy film of iron (Fe), aluminum (Al) and silicon (Si) having a coefficent of expansion of about $140 \times 10^{-7}$. Magnetic blocks 15 and 16 are both formed of manganese-zinc (Mn-Zn) polycrystalline ferrite which has a coefficient of expansion of about $115 \times 10^{-7}$. Thus, the difference in the coefficients of expansion between I-shaped core block 15 and thin magnetic layer 10 is about $25 \times 10^{-7}$.

It is desirable to reduce the difference in the coefficients of expansion, since this directly affects the difference in expansivity of the different materials. Additionally, the difference in expansivity can be reduced by reducing the temperature T or the length l. Temperature is determined by the particular adhesive glass selected. Length l can be reduced by formation of vertical grooves 17 and horizontal groove 18 as shown.

It is important to reduce the surface area of confronting surface 21 of magnetic core block 15 as shown in FIG. 8B. Confronting gap face 21 of magnetic core block 15 has width e between about 30 and 15μm and length d between about 30 and 200μm. The smaller the width e, the smaller the difference in expansion between I-shaped core block 15 and thin magnetic layer 10. However, if width e is too small, the recording and reproducing efficiency of magnetic core chip 5 deteriorates. Therefore, width e should be equal to or greater than about 30um.

FIG. 6 illustrates that width e of confronting surface 21 also determines length c' of rear gap 12. If the width e is too small, the recording and reproducing efficiency of magnetic core chip 5 is reduced. Therefore, it is difficult to have a width e of less than about 30ρm.

Figure 9:
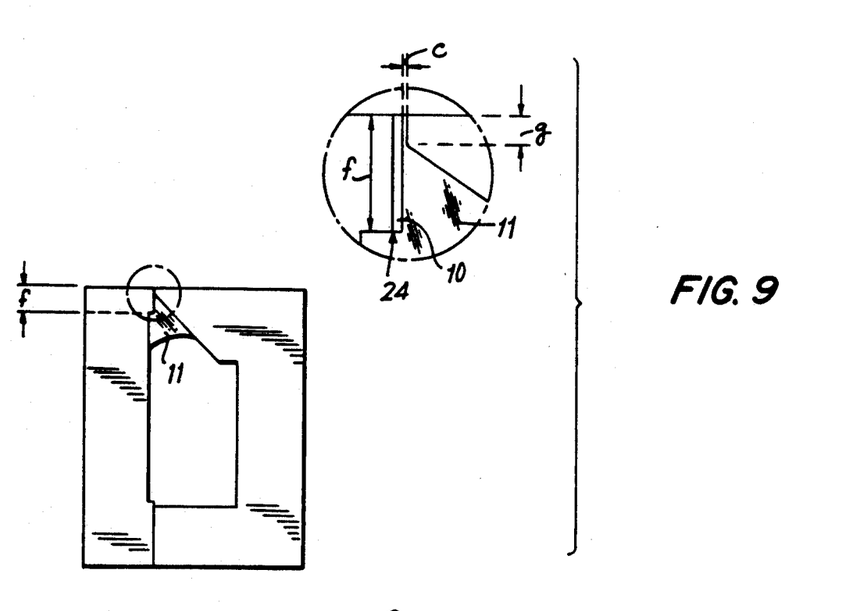
FIG. 9 is a side view of the magnetic core chip showing a secondary adhesive member used to join two magnetic core blocks in accordance with the invention.

The magnetic properties illustrated in FIG. 9 show that length d affects the gap depth f of a fictitious gap 24. The length d of confronting gap face 21 of magnetic core block 15 is equal to the gap depth f of fictitious gap 24. The amount of noise increases when length d is short. Accordingly, length d is preferably not less than about 30μm although length d can be less than 30μm if the depth of fictitious gap 24 is approximately 5 times the depth of front gap 9. Width e and length d confronting surface 21 have an effect on the adhesive strength of the bond between thin magnetic layer 10 and I-shaped core block 15. Specifically, if the adhesive strength is low, the width e and length d should be decreased even though it is preferable for the efficiency of the magnetic head to increase the width e and the length d of confronting gap face 21 of magnetic core block 15.

Thin non-magnetic layer 22 is formed on confronting surface 21 in order to increase adhesive strength between thin magnetic layer 10 and magnetic core block 15. Thin non-magnetic layer 22 is preferably formed of chromium (Cr) or titanium (Ti) by radio frequency (RF) sputtering at 200Å. In a preferred embodiment, the chromium or titanium layer has a thickness between about 200 and 500Å. If the thickness is greater than about 500Å the chromium or titanium cannot be diffused readily and a fictitious magnetic gap is formed between block 15 and thin magnetic layer 10 causing a fictitious output to be generated. Thin magnetic layer 10 of Fe-Al-Si is formed by DC sputtering on thin nonmagnetic layer 22. SiO₂ film 23 is deposited on thin magnetic layer 10 by an RF sputtering process along the length c of gap 9.

Figure 8F:
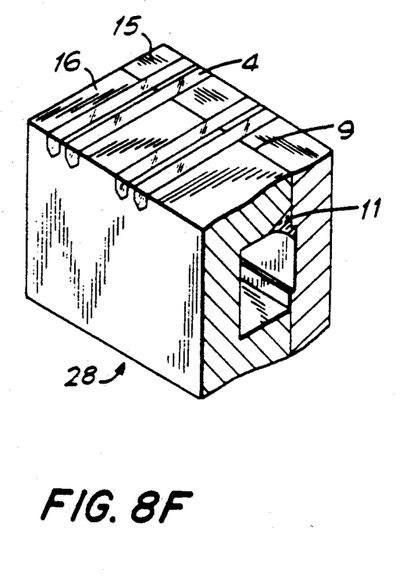
Figure 8G:
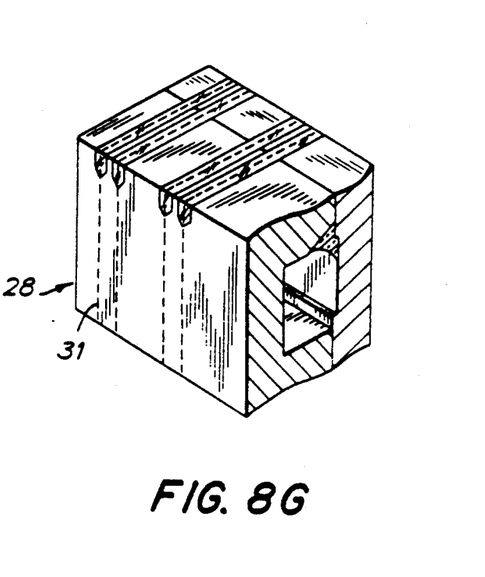

The advantages described are obtained by forming horizontal groove 17 and vertical grooves 18 in core block 15 and providing thin non-magnetic layer 22 on confronting surface 21. By providing a series of additional grooves 29 across the top of core block 28 for controlling track width h on magnetic block 28, additional advantages are obtainable. Since track width control grooves 29 are processed after forming magnetic gap 9, accurate adhesive processes are not required. A secondary adhesive glass 4 is deposited in grooves 29 as shown in FIG. 8F. Magnetic core block 28 is then cut along dotted line 31 at the mid-point of grooves 29 as shown in FIG. 8G to provide magnetic core chip 5.

Figure 10:
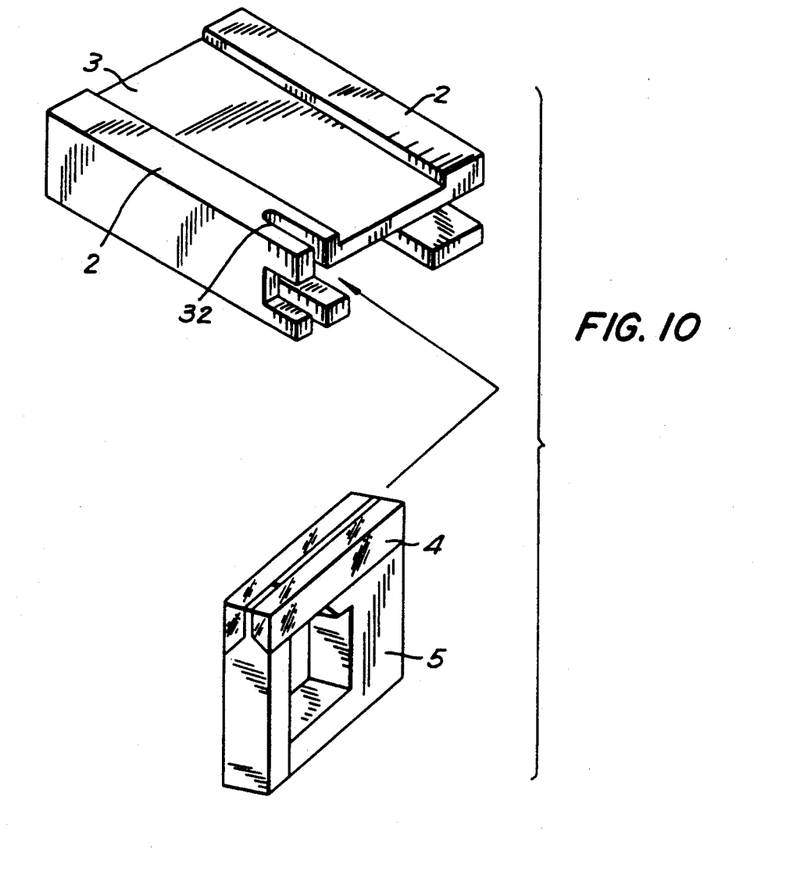
FIG. 10 is an exploded perspective view showing how a magnetic core chip is embedded in a sliding member.

FIG. 10 is a perspective view illustrating the secondary adhesive process for integrally securing magnetic core chip 5 in slide member 3. Secondary adhesive glass 4 is deposited about magnetic core chip 5 positioned in a slit 32 of sliding member 3 while maintaining magnetic block 28 at an elevated temperature. Secondary adhesive glass 4 is melted and forms an integral body with sliding member 3 and magnetic core chip 5 therein. The temperature of secondary adhesive glass 4 is maintained at approximately 465° C. for about 60 minutes. Preferably, the temperature of secondary adhesive glass 4 is maintained less than the working point temperature of primary adhesive glass 11 used for integrally joining I-shaped core block 15 and U-shaped core block 16. Primary adhesive glass 11 should have a working point temperature of less than about 650° C. because the magnetic characteristics of Fe-Al-Si thin magnetic layer 10 can deteriorate at temperatures over about 650° C.

In a preferred embodiment, a glass having a working point of 580° C. is utilized. Therefore secondary adhesion between slide member 3 and magnetic chip 5 is performed at a temperature lower than the working point of primary adhesive glass 11, specifically, about 465° C. Secondary adhesive glass 4 should have a maximum working point of 550° C. If secondary adhesive glass 4 has a working point greater than about 550° C., primary adhesive glass 11 will melt causing magnetic gap 9 to enlarge. On the other hand, when an adhesive glass having a working point of less than about 550° C. is used as secondary adhesive glass 4, secondary adhesive glass 4 is too soft compared to primary adhesive glass 11. As a result, the slide surface 2 of secondary adhesive glass 4 wears due to frictional contact between secondary adhesive glass 4 and recording medium 33. To eliminate this problem, secondary adhesive glass 4 and recording medium 33 should be positioned at a distance so as not to contact each other. Alternatively, the contact period should be minimized.

Figure 11:
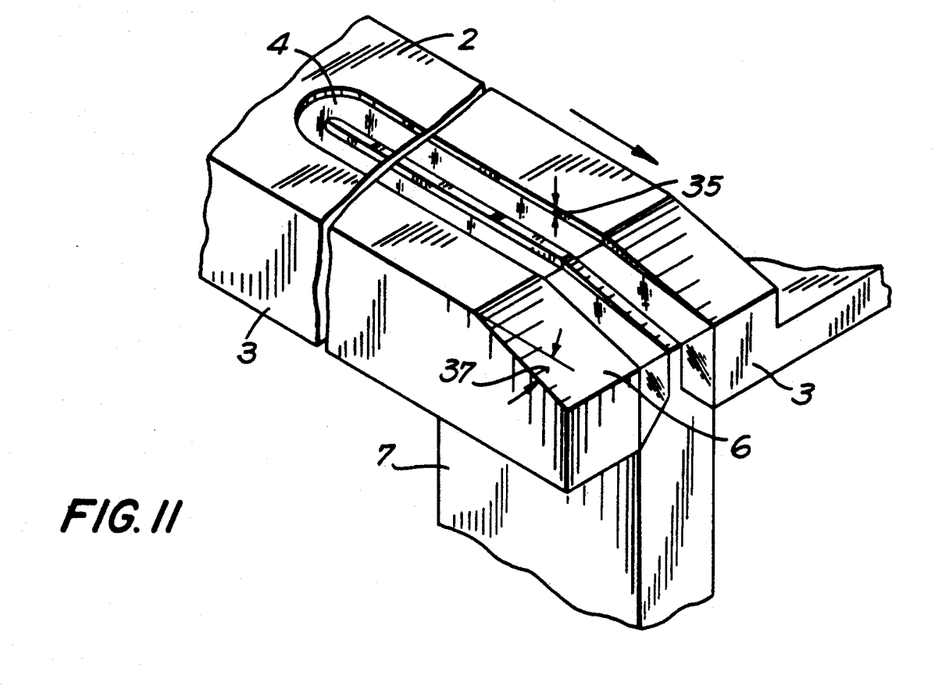
FIG. 11 is a partial perspective view showing a secondary adhesive glass on a sliding contact surface.
Figure 12:
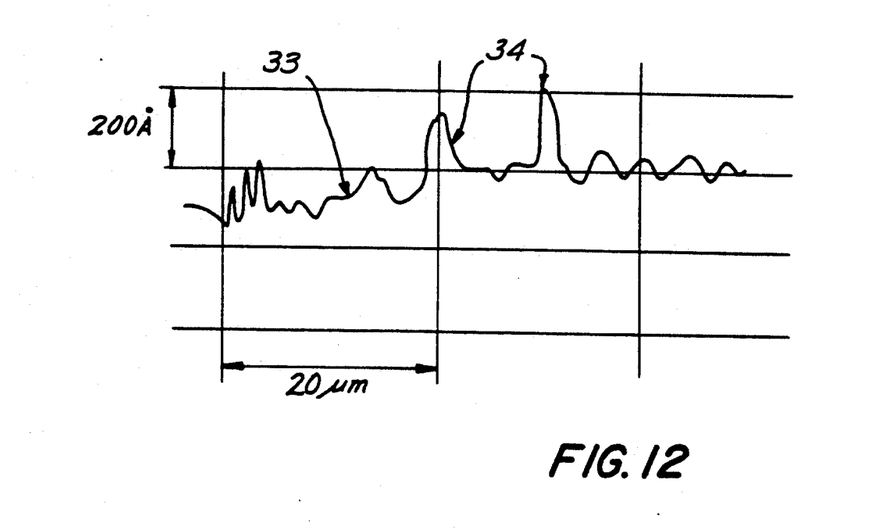
FIG. 12 is an enlarged side elevational view of the surface of a recording medium.
Figure 13A:
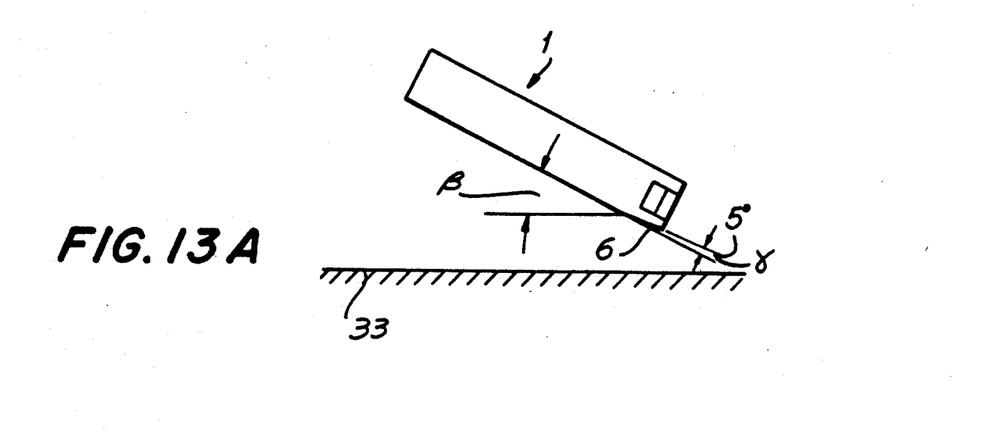
FIGS. 13A, 13B and 13C are side elevational views showing a magnetic recording medium in contact with a magnetic recording head.
Figure 13B:
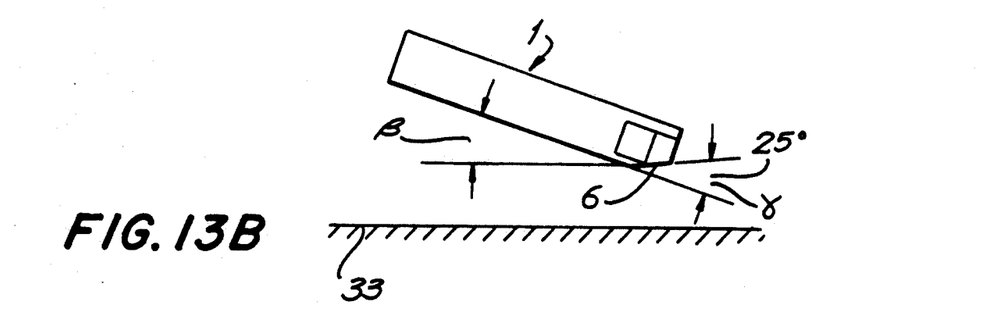
Figure 13C:
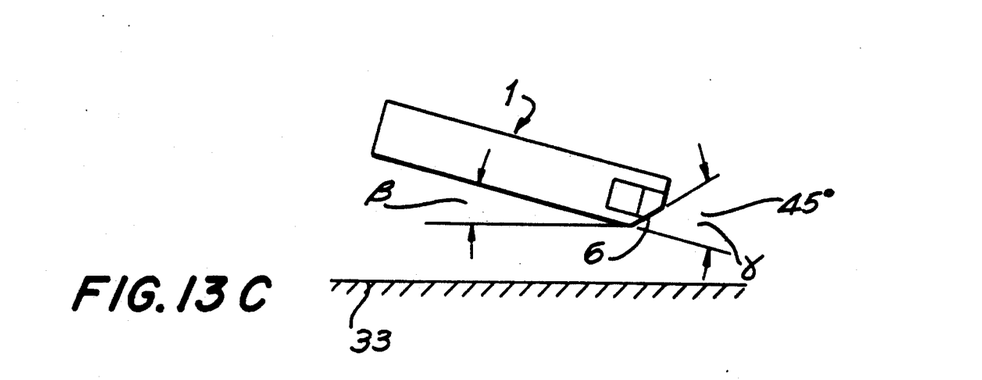

Wear between secondary adhesive glass 4 and recording medium 33 can be prevented by recessing secondary adhesive glass 4 from slide surface 2 of sliding member 3 by approximately 30nm as shown in FIG. 11. Additionally, slide surface 2 may be formed with an inclined surfaces 6 of approximately 5nm along the advancing edge of recording medium 33 so that the contact period is shortened. The surface roughness of a recording medium 22 as illustrated in FIG. 12 can cause secondary adhesive glass 4 to wear. By recessing the secondary adhesive glass 4 from slide surface 2 by approximately 30nm, wear on secondary adhesive glass 4 is prevented. In flying type magnetic recording heads, the flying height and the flying roll affect the amount of recess that is required. If the recess is approximately 100um, the flying roll is not significantly inclined. FIGS. 13A, 13B and 13C show slide member 3 in an inclined position along an advancing edge of recording medium 33 in order to increase pitch angle 36 during flying. As pitch angle $\beta$ increases, incline angle $\alpha$ decreases.

Figure 14:
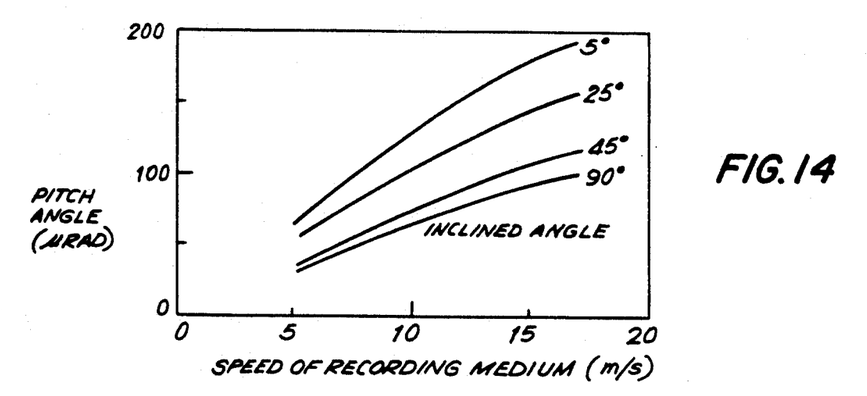
FIG. 14 is a graph showing the relationship between pitch angle and speed of the recording medium for several different inclined angles.

FIG. 14 shows the relationship between the rotation speed of recording medium 33 and pitch angle $\beta$. When inclined surface 6 of slide surface 2 is inclined at an angle of 5°, the pitch angle $\beta$ is large even if the speed of recording medium 33 is reduced. Specifically, recording medium 33 is in contact with secondary adhesive glass 4 for a short period of time when rotation of recording medium 33 is started and stopped. As is apparent from FIG. 14, the inclined angle $\alpha$ is preferably between about 5° and 25°. By reducing the contact time between recording medium surface 33 and the slide surface 2 of slide member 3, the contact time between secondary adhesive glass 4 and recording medium surface 33 is reduced. As a result, the wear on recording medium surface 33 and slide surface 2 is also reduced. Wear on secondary adhesive glass 4 due to roughness of recording medium 33 is prevented when recess 35 and inclined surface 6 are used. Since the glass is not worn during use, recording and reproducing characteristics of thin magnetic layer 10 are stabilized.

In the embodiment shown, Fe-Al-Si thin magnetic layer 10 is formed by sputtering. The composition of the alloy target preferably contains 9.5±0.5% by weight of silicon, 5.5±0.5% by weight of aluminum and the balance of iron. A thin magnetic layer having a thickness of 3μm is formed by preliminary sputtering for 10 minutes under conditions of an initial pressure of $8 \times 10^{-7}$ Torr, an argon gas pressure of 3mTorr and an applied power of DC 300 V and 3.2A. Further sputtering is carried out for 30 minutes at a rate of approximately 100A per minute. A current of RF 100 W is applied to the substrate bias and the thin magnetic layer is maintained at a temperature of 600° for 2 hours in order to carry out an annealing process. The annealing can be carried out at the same time that U-shaped core block 16 is integrally joined to I-shaped core block 15. However, thin magnetic layer 10 can be eroded by primary adhesive glass 11 and deteriorate during adhesion if the temperature is too high. Therefore, it is necessary to control the adhesion time and adhesion temperature optimally. The adhesion temperature is approximately 580° C.±3° C. with an adhesion time of about 60 minutes ±5 minutes.

Figure 15:
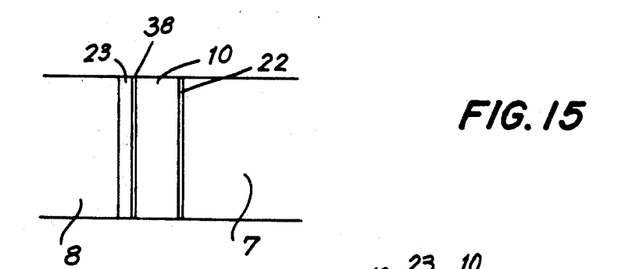
FIG. 15 is a front elevational view showing a magnetic gap in accordance with another embodiment of the invention.

FIG. 15 shows the gap region of another embodiment of the invention wherein a chromium protective layer 38 is formed between thin magnetic layer 10 and SiO$_2$ film 23 in order to prevent primary adhesive glass 11 from eroding thin magnetic layer 10. In this embodiment, thin magnetic layer 10 is formed on I-shaped core 7 which is disposed on the recording medium advancement side of the composite magnetic head 1. However, if U-shaped core 8 is disposed on the medium advancement side, thin magnetic layer 10 is desirably formed on U-shaped core 8.

Figure 16:
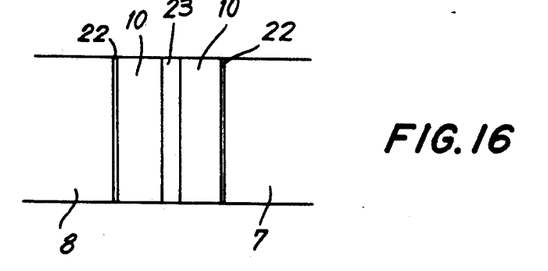
FIG. 16 is a front elevational view showing a magnetic gap in accordance with a still further embodiment of the invention.

FIG. 16 is an enlarged front view primarily showing a magnetic gap 9' formed in accordance with another embodiment of the invention. Two thin magnetic layers 10 are provided on opposed surfaces of I-shaped core 7 and U-shaped core 8. A non-magnetic primary adhesive member 22 is formed between each thin magnetic layer 10 and core block 28 components, making it possible to increase the adhesive strength between core block 28 and thin magnetic layers 10. When thin magnetic layers 10 are formed on both I-shaped core 7 and U-shaped core 8, it is available for perpendicular magnetic recording and the like. Longitudinal magnetic recording can be performed efficiently by forming thin magnetic layer 10 on only one side of core block 28.

Figure 17:
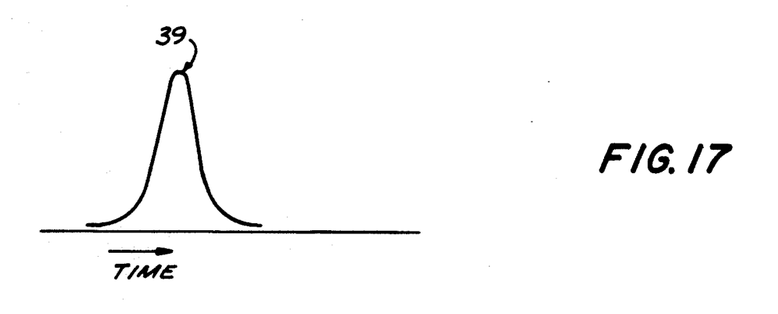
FIG. 17 is a graph showing a characteristic output waveform generated using the recording head of the invention.

FIG. 17 illustrates the characteristic output for an isolated waveform when composite magnetic head 1 and a fixed magnetic disk are combined for recording and reproducing. No fictitious output is generated even when the contact, start and stop processes are repeated 20,000 times. Accordingly, it has been determined that the embodiment of the invention provides excellent recording and reproducing characteristics.

As can be seen from the description, a flying head for a fixed magnetic disk device is described, but the invention can also be adapted for magnetic heads for floppy disk devices, videotape recorders and the like. A composite type magnetic recording head having a sliding member formed of a non-magnetic material and having a slit therein flies above or in contact with a recording medium. A pair of magnetic core chips are provided in the slit and confront each other via a magnetic gap to form a magnetic circuit with a glass adhesive provided in the slit. A magnetic circuit generates a magnetic flux in the magnetic gap. The core chips on the side along the advancement edge of the recording medium has vertical and horizontal grooves on the surface confronting the magnetic gap. A first thin non-magnetic layer of titanium or chromium is provided on the ungrooved balance surfaces of the confronting surfaces and a thin magnetic layer is disposed on the titanium or chromium layer. As a result, it is possible to increase the adhesive strength of the magnetic member and the thin magnetic layer and allow a second thin magnetic layer to be eliminated. It is also possible to stabilize the process, resulting in improved manufacturing yield and elimination of fictitious outputs. Furthermore, since the thickness of the thin magnetic layer is minimized as compared with those used in the prior art, the number of manufacturing process steps is reduced. In addition, since track width control grooves are processed after forming the magnetic gap, it is possible to eliminate the necessity for a time consuming accurate adhesion process and further, improved yields result.

A glass having a viscosity of $10^4$ poise at a working point of 550° C. or less is used as an adhesive for integrally forming the sliding member with the core chip. As a result, it is possible to eliminate property deterioration of the thin magnetic layer. Furthermore, since the slide member and slide surface of the core chip are inclined at an angle of 25° or less at the advancing edge, the pitch angle becomes larger at the time of flying above the recording medium. Accordingly, it is possible to minimize the contact time of the recording medium and the adhering member. Since the plane of the adhesive is recessed from the slide surfaces of the sliding member by 30nm or greater so as not to bring the recording medium into contact with the adhesive, it is possible to prevent the material from being removed from the adhesive or the recording medium due to wear. Durability is improved and removal of the thin magnetic layer is prevented over an extended period of time thereby preventing generation of a fictitious output.

It will thus be seen that the objects set forth above, among those made apparent from the preceding description, are efficiently attained and, since certain changes may be made in carrying out the above process and in the article set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

We claim:

1. A composite magnetic head comprising:
   a slide member having a slit provided therein and a magnetic core chip mounted in the slit;
   the core chip formed of two opposed magnetic members including an I-shaped magnetic member having ends and a U-shaped magnetic member including a plurality of arms each with a confronting surface, the I-shaped magnetic member being formed with a horizontal groove to at least in part define the length of two confronting gap faces at said ends of said I-shaped magnetic member for positioning so as to face corresponding confronting surfaces of the arms of the U-shaped magnetic member and vertical grooves at said ends of said I-shaped magnetic member to at least in part define the width of said confronting gap faces, lengths being viewed as being oriented essentially parallel to the direction in which the I-shaped magnetic member extends, widths being viewed as being oriented essentially perpendicular to lengths, depths being viewed as being oriented essentially parallel to lengths;
   a thin non-magnetic layer disposed on said confronting gap faces of the I-shaped magnetic member, a thin magnetic layer disposed on the thin non-magnetic layer, a thin dielectric layer disposed on the thin magnetic layer, said thin dielectric layer on said confronting gap faces of the I-shaped magnetic member being joined to the confronting surfaces of the arms of the U-shaped magnetic member to form a magnetic core with a magnetic gap formed by said thin dielectric layer;
   the thin magnetic layer having a higher saturation flux density than the magnetic members; and the length of the confronting surface on the arm of said U-shaped magnetic member at least in part defining the depth of the magnetic gap and being less than the length of the opposed confronting gap face of the I-shaped magnetic member at least in part defining the depth of a fictitious gap, said opposed confronting gap face of the I-shaped magnetic member defining the depth of the fictitious gap being dimensioned relative to the opposed confronting surface of said U-shaped magnetic member defining the depth of the magnetic gap to both substantially eliminate fictitious output noise from the thin non-magnetic layer and substantially eliminate cracking of the magnetic core and non-adhesion of the thin magnetic layer from the thin non-magnetic layer when said I-shaped magnetic member and U-shaped magnetic member are joined at elevated temperatures.

2. The composite magnetic head of claim 1, wherein the thin magnetic layer is an alloy if iron-aluminum-silicon.

3. The composite magnetic head of claim 1, wherein the thin non-magnetic layer is chromium.

4. The composite magnetic head of claim 1, wherein the thin non-magnetic layer is titanium.

5. The composite magnetic head of claim 1, wherein the slide member has at least one slide surface and at least one inclined surface; the core chip and the slide member have inclined surfaces disposed at an angle of 25° or less with respect to an advancing edge of a recording medium.

6. The composite magnetic head of claim 1, wherein the slide member and the core chip are integrated using an adhesive glass.

7. The composite head of claim 6, wherein the adhesive glass has a viscosity of $10^4$ poise at from 465° to 550° C.

8. The composite head of claim 1, wherein said slide member has a slide surface through which said slit passes, said core chip having an end surface extending essentially in the plane of the slide surface and essentially orthogonal to the facing confronting surface and confronting gap face, the core chip end surface having a pair of spaced grooves therein extending essentially along the length of said slit, and further including a secondary adhesive disposed in said spaced grooves in the end surface, recessed from the slide surface.

9. The composite head of claim 8, wherein the adhesive is recessed by 30 nm or greater from the slide surface.

10. The composite head of claim 1, wherein the slide member includes a sliding surface for one of flying across and contacting a recording medium.

11. The composite magnetic head of claim 1, wherein the depth of the fictitious gap is approximately five times the depth of the magnetic gap.

12. The composite magnetic head of claim 11, wherein at least one arm of said U-shaped magnetic member includes a diagonal cut-away region extending from its confronting surface for at least in part defining at least a portion of said magnetic gap.

13. A magnetic core chip for a composite magnetic head, comprising:
    a first I-shaped magnetic member having ends and a second magnetic member, said second magnetic member formed in a U-shape including two arms each with a confronting surface, the first I-shaped magnetic member being formed with a horizontal groove to in part define two confronting gap faces at said ends of the first I-shaped magnetic member for joining to the confronting surfaces of the arms of the second U-shaped magnetic member and vertical grooves at said ends of said I-shaped magnetic member to define the width of each of said confronting gap face of the first I-shaped magnetic member;
    a thin non-magnetic layer disposed on at least one of said confronting gap faces of the first I-shaped magnetic member;
    a thin magnetic layer disposed on the non-magnetic layer; and
    a thin dielectric layer disposed on the thin magnetic layer and means joining the first I-shaped magnetic member to the second U-shaped magnetic member so that the dielectric layer abuts the corresponding facing confronting surface of an arm of the second U-shaped magnetic member to form a magnetic core with a magnetic gap formed by the thin dielectric layer, the confronting gap faces having a length defined by the horizontal groove and a width defined by the vertical grooves, the thin magnetic layer having a higher saturation flux density than the first I-shaped and second U-shaped magnetic members, the length of the confronting surface on the arm of said second U-shaped magnetic member at least in part defining the depth of the magnetic gap and being less than the length of the opposed confronting gap face of the first I-shaped member at least in part defining the depth of a fictitious gap, lengths being viewed as being oriented essentially parallel to the direction in which the I-shaped magnetic member extends, widths being viewed as being oriented essentially perpendicular to lengths, depths being viewed as being oriented essentially parallel to lengths, said at least one confronting gap face of the first I-shaped magnetic member defining the depth of the fictitious gap being dimensioned relative to the opposed confronting surface of said second U-shaped magnetic member defining the depth of the magnetic gap to both substantially eliminate fictitious output noise from the thin non-magnetic layer and substantially eliminate cracking of the magnetic core and non-adhesion of the thin magnetic layer from the thin non-magnetic layer when said first I-shaped magnetic member and second U-shaped magnetic member are joined at elevated temperatures.

14. The magnetic core chip of claim 13, wherein the thin magnetic layer is made of an alloy of iron-aluminum-silicon and the thin non-magnetic layer is made of Cr or Ti and is deposited on the I-shaped magnetic member.

15. The magnetic core chip of claim 14, wherein the first I-shaped magnetic member is facing a side of advancement of a leading edge of a recording medium.

16. The magnetic core chip of claim 13, wherein the first I-shaped magnetic member and second magnetic member are formed of manganese zinc polycrystalline ferrite.

17. The magnetic core chip of claim 13, wherein the joining means is a glass adhesive.

18. The magnetic core chip of claim 13, wherein a silicon dioxide layer is deposited in the gap formed between the thin magnetic layer and the opposed confronting surfaces of the U-shaped magnetic.

19. The core chip of claim 13, wherein the depth of the fictitious gap is approximately five times the depth of the magnetic gap.

20. The magnetic core chip head of claim 13, wherein at least one arm of said U-shaped magnetic member includes a diagonal cut-away region extending from its confronting surface for at least in part receiving said adhesive.

21. A composite magnetic head comprising:
a slide member having a slit provided therein and a magnetic core chip mounted in the slit;
the core chip formed of two opposed magnetic members including an I-shaped magnetic member having ends and a U-shaped magnetic member including a plurality of arms each with a confronting surface, the I-shaped magnetic member being formed with a horizontal groove to at least in part define the length of two confronting gap faces at said ends of said I-shaped magnetic member for positioning so as to face corresponding confronting surfaces of the arms of the U-shaped magnetic member and vertical grooves at said ends of said I-shaped magnetic member to at least in part define the width of said confronting gap faces, lengths being viewed as being oriented essentially parallel to the direction in which the I-shaped magnetic member extends, widths being viewed as being oriented essentially perpendicular to lengths; and
a thin non-magnetic layer disposed on said confronting gap faces of the I-shaped magnetic member, a thin magnetic layer disposed on the thin non-magnetic layer, a thin dielectric layer disposed on the thin magnetic layer, said thin dielectric layer n said confronting gap faces of the I-shaped magnetic member being joined to the confronting surfaces of the arms of the U-shaped magnetic member to form a magnetic core with a magnetic gap formed by said thin dielectric layer, the length of the confronting gap face facing said at least one arm of said U-shaped magnetic member at least in part defining the depth of a fictitious gap, depths being viewed as being oriented essentially parallel to lengths, and the length of the portion of the confronting surface of said at least one arm to which the dielectric layer is joined at least in part defining the depth of a magnetic gap, said length of the confronting gap face of the I-shaped magnetic member defining the depth of said fictitious gap being less than 30 µm and the depth of the fictitious gap being approximately five times the depth of the magnetic gap.

22. The composite magnetic head of claim 21, wherein at least one of said confronting gap faces of said I-shaped magnetic member has a width of between about 30 and 150 µm.

23. A magnetic core chip for a composite magnetic head, comprising:
a first I-shaped magnetic member having ends and a second magnetic member, said second magnetic member formed in a U-shape including two arms each with a confronting surface, the first I-shaped magnetic member being formed with a horizontal groove to in part define two confronting gap faces at said ends of the first I-shaped magnetic member for joining to the confronting surfaces of the arms of the second U-shaped magnetic member and vertical grooves at ends of said I-shaped magnetic member to define the width of each of said confronting gap face of the first I-shaped magnetic member;
a thin mon-magnetic layer disposed on at least one of said confronting gap faces of the first I-shaped magnetic member;
a thin magnetic layer disposed on the non-magnetic layer; and
a thin dielectric layer disposed on the thin magnetic layer and means joining the first I-shaped magnetic member to the second U-shaped magnetic member so that the dielectric layer abuts the corresponding facing confronting surface of an arm of the second U-shaped magnetic member to form a magnetic core with a magnetic gap formed by the thin dielectric layer, the confronting gap faces having a depth defined by the horizontal groove and a width defined by the vertical grooves the thin magnetic layer having a higher saturation flux density than the first I-shaped and second U-shaped magnetic members, the length of the confronting gap face facing said at least one arm of said second U-shaped magnetic member at least in part defining a fictitious gap depth and the length of the portion of the confronting surface of said at least one arm to which the dielectric layer is joined at least in part defining the depth of a magnetic gap, lengths being viewed as being oriented essentially parallel to the direction in which the first I-shaped magnetic member extends, width being viewed as being oriented essentially perpendicular to lengths, and depths being oriented essentially parallel to lengths, the length of the confronting gap face of the first I-shaped magnetic member defining the depth of said fictitious gap being less than 30 μm, the depth of the fictitious gap being approximately five times the depth of the magnetic gap.

24. The magnetic core chip of claim 23, wherein at least one of said confronting gap faces of said first I-shaped magnetic member has a width of between about 30 and 150 μm.

25. A composite magnetic head comprising:
a slide member having a slit provided therein and a magnetic core chip mounted in the slit;
the core chip formed of two opposed magnetic members including an I-shaped magnetic member having ends and a U-shaped magnetic member including a plurality of arms each with a confronting surface, the I-shaped magnetic member being formed with a horizontal groove to at least in part define the length of two confronting gap faces at said ends of said I-shaped magnetic member for positioning so as to face corresponding confronting surfaces of the arms of the U-shaped magnetic member and vertical grooves at said ends of said I-shaped magnetic member to at least in part define the width of said confronting gap faces, lengths being viewed as being oriented essentially parallel to the direction in which the I-shaped magnetic member extends, widths being viewed as being oriented essentially perpendicular to lengths;
a thin non-magnetic layer disposed on said confronting gap faces of the I-shaped magnetic member, a thin magnetic layer disposed on the thin non-magnetic layer, a thin dielectric layer disposed on the thin magnetic layer, said thin dielectric layer being joined to the confronting surfaces of the arms of the U-shaped magnetic member to form a magnetic core with a magnetic gap formed by said thin dielectric layer; and
the thin magnetic layer having a higher saturation flux density than the magnetic members, the length of the confronting surface on the arm of said U-shaped magnetic member at least in part defining the magnetic gap being less than the length of the opposed confronting gap face of the I-shaped magnetic member, the length of the confronting gap face facing said at least one arm of said U-shaped magnetic member at least in part defining the depth of a fictitious gap, depths being viewed as being oriented essentially parallel to lengths, the length of the portion of the confronting surface of said at least one arm to which the dielectric layer is joined at least in part defining the depth of a magnetic gap, the length of the confronting gap face defining the depth of the fictitious gap being between about 30 and 200 μm.

26. The composite magnetic head of claim 25, wherein said width of said confronting gap face of said first I-shaped magnetic member is between about 30 and 150 μm.

27. A magnetic core chip for a composite magnetic head, comprising:
a first I-shaped magnetic member having ends and a second magnetic member, said second magnetic member formed in a U-shape including two arms each with a confronting surface, the first I-shaped magnetic member being formed with a horizontal groove to in part define two confronting gap faces at said ends of the first I-shaped magnetic member for joining to the confronting surfaces of the arms of the second U-shaped magnetic member and vertical grooves at said ends of said I-shaped magnetic member to define the width of each of said confronting gap face of the first I-shaped magnetic member;
a thin non-magnetic layer disposed on at least one of said confronting gap faces of the first I-shaped magnetic member;
a thin magnetic layer disposed on the non-magnetic layer; and
a thin dielectric layer disposed on the thin magnetic layer and means joining the first I-shaped magnetic member to the second U-shaped magnetic member so that the dielectric layer abuts the corresponding facing confronting surface of an arm of the second U-shaped magnetic member to form a magnetic core with a magnetic gap formed by the thin dielectric layer, the confronting gap faces having a depth defined by the horizontal groove and a width defined by the vertical grooves, the thin magnetic layer having a higher saturation flux density than the first I-shaped and second U-shaped magnetic members, the length of the confronting surface on the arm of said second U-shaped magnetic member at least in part defining the depth of the magnetic gap being less than the length of the opposed confronting gap face of the first I-shaped magnetic member, lengths being viewed as being essentially parallel to the direction in which the I-shaped magnetic member extends, widths being viewed as being oriented essentially perpendicular to lengths, depths being oriented essentially parallel to lengths, the length of the confronting gap face facing said at least one arm of said U-shaped magnetic member at least in part defining a fictitious gap depth and the length of the portion of the confronting surface of said at least one arm to which the dielectric layer is joined at least in part defining the depth of a magnetic gap, the length of said confronting gap face defining the depth of the fictitious gap being between about 30 and 200 μm.

28. The magnetic core chip of claim 27, wherein said width of said confronting gap face of said first I-shaped magnetic member is between about 30 and 150 μm.

* * * * *